J. B. MARS.
IMPLEMENT FOR USE IN REMOVING THE CONTENTS OF EGGS.
APPLICATION FILED MAY 15, 1919.
1,316,315. Patented Sept. 16, 1919.
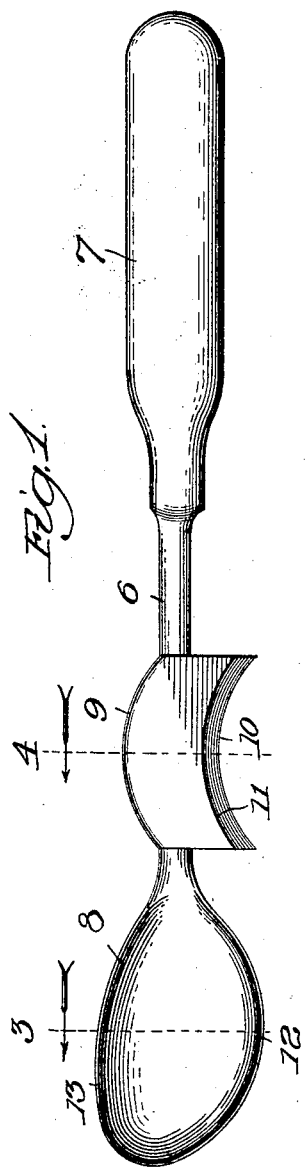
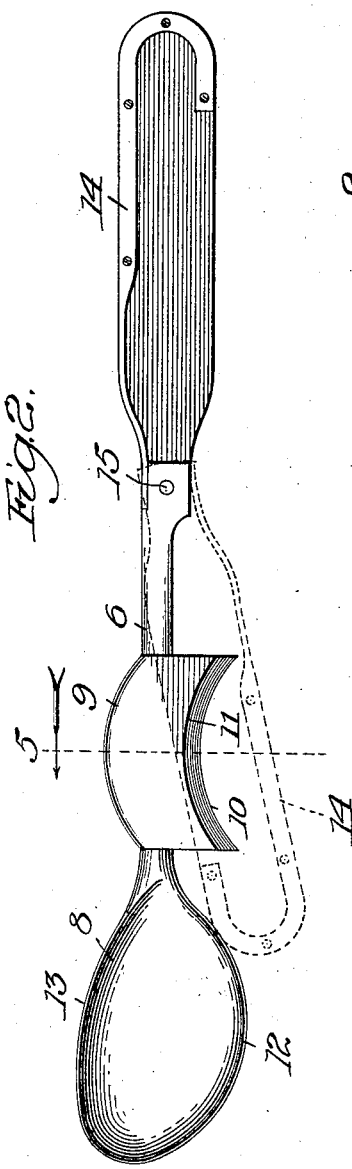
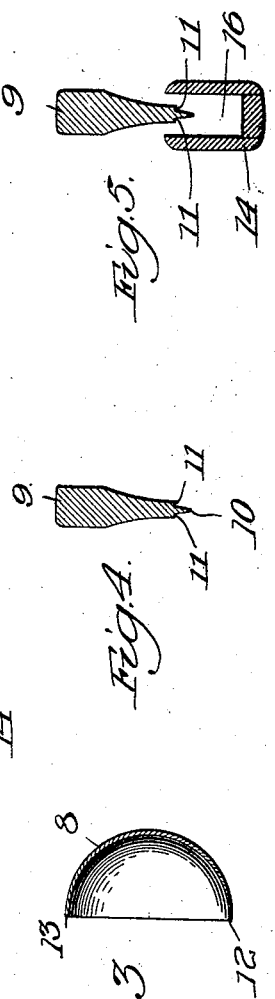
Witnesses:
Inventor:
Jesse B. Mars

UNITED STATES PATENT OFFICE.

JESSE B. MARS, OF CHICAGO, ILLINOIS.

IMPLEMENT FOR USE IN REMOVING THE CONTENTS OF EGGS.

1,316,315.  Specification of Letters Patent.  Patented Sept. 16, 1919.

Application filed May 15, 1919. Serial No. 297,330.

*To all whom it may concern:*

Be it known that I, JESSE B. MARS, a subject of the Shah of Persia, and residing at Chicago, in the county of Cook and State of Illinois, have invented a new and useful Improvement in Implements for Use in Removing the Contents of Eggs, of which the following is a specification.

My invention relates more particularly to implements for opening boiled eggs and the removal of the contents thereof, preferably to an implement so constructed that both of these operations may be effected; and my objects, generally stated, are to provide means which may be readily used, as for example at a dining table, for breaking open the shells of boiled eggs, more especially without breaking the yolk, and removing the contents therefrom.

Referring to the accompanying drawing:

Figure 1 is a view in side elevation of an implement constructed in accordance with my invention and presenting features whereby both of the operations above referred to may be effected by a single implement; Fig. 2 is a view like Fig. 1, of a modification of the structure shown in this figure; Fig. 3 is a section taken at the line 3 on Fig. 1 and viewed in the direction of the arrow; Fig. 4 is a section taken at the line 4 on Fig. 1 and viewed in the direction of the arrow; and Fig. 5 is a section taken at the line 5 on Fig. 2 and viewed in the direction of the arrow.

Referring first to the structure shown in Figs. 1, 3 and 4, and wherein the implement is provided as a combined egg-shell opening and content-removing structure, the device is formed of a shank portion 6 having a handle portion 7 rigid therewith, the opposite end of the shank 6 being formed with a portion 8 of general spoon shape. Between the spoon portion 8 and the handle 7, the shank 6 is provided with a member represented at 9 for breaking the shell of an egg between its ends to facilitate the breaking of the shell into two parts to give access to the contents of the shell.

The member 9, which may be of metal, and is preferably made of such material, is shown as forming a part of the shank 6, though it may be formed separately therefrom, this member being sharpened along one edge as represented at 10, and preferably provided of general curved form as represented in Fig. 2 to cause the edge 10 to substantially conform in contour, to the cross-sectional contour of an egg. The cutting edge 10 is flanked preferably at both sides by shoulders 11 which preferably conform to the curved shape of the cutting edge 10 and serve as stops to limit the degree of penetration of the member 9 at its cutting edge 10, into the egg in the operation of breaking the shell substantially midway between the ends of the egg, or in other words at the place where eggs are commonly broken in the operation of opening a boiled egg, these shoulders 11 being so disposed that while the cutting edge 10 preferably penetrates the shell, this cutting edge will not cut into the yolk of the egg, it being understood from the foregoing that in the use of the implement to open an egg the user while holding the egg in one hand and the implement in the other strikes the egg a crosswise blow with the cutting edge 10 of the implement.

The spoon portion 8 of the implement is provided for the removal of the contents of the egg after it has been opened, the shape of this portion being preferably substantially as shown to cause one of its edges, represented at 12, to be of a shape substantially conforming to the curve presented by the portion of the egg opposed by the spoon in the operation of removing the contents therefrom, its opposite edge represented at 13 being relatively straight as compared with the edge 12. By so shaping the spoon, which is of general curved shape in cross-section as shown in Fig. 3, the operator is enabled to very quickly, by rotating the spoon in the egg shell, remove the contents of the egg.

In the structure shown in Figs. 2 and 5, the shank 6 instead of having a rigid handle portion 7 is equipped with a folding handle portion 14 pivoted with the shank as indicated at 15 in a manner such as is common in folding knives, the handle portion 14 containing a channel 16 along one edge thereof into which the cutting edge 10 extends, for the purpose of guarding this edge against dulling, when the handle 14 is folded to the position shown in dotted lines in Fig. 2, the outer end of the handle 14 bearing against the spoon part 8 when the device is folded, as shown in Fig. 2.

While I have illustrated and described a particular construction embodying my invention, I do not wish to be understood as intending to limit it thereto as the same may be variously modified and altered without departing from the spirit of my invention.

What I claim as new and desire to secure by Letters Patent is:

1. An egg-opening implement formed of a member adapted to be held in the hand and provided with a portion having an egg-shell-opening edge extending lengthwise of the implement and curved in a direction lengthwise of the latter, and adapted to penetrate the shell upon striking the latter with the implement, said curved portion conforming substantially to the curvature of the side of the shell of the egg.

2. An egg-opening implement formed of a member adapted to be held in the hand and provided with a blade having an operating edge curved in a direction lengthwise of the blade, with a shoulder portion forming a stop to limit the penetration of said edge into an egg shell sufficiently deep to penetrate the yolk of an egg upon striking the shell with the operating edge of said blade.

JESSE B. MARS.

Copies of this patent may be obtained for five cents each, by addressing the "Commissioner of Patents, Washington, D. C."